Sept. 16, 1958  H. A. DORMAN ET AL  2,852,012
SUPERCHARGERS FOR MOTOR VEHICLE ENGINES
Original Filed June 24, 1953

INVENTORS.
HARLEY H. DORMAN.
DOUGLAS P. DORMAN.
By Wallace P. Lamb
ATTORNEY.

United States Patent Office 2,852,012
Patented Sept. 16, 1958

2,852,012

SUPERCHARGERS FOR MOTOR VEHICLE ENGINES

Harley A. Dorman, Detroit, Mich., and Douglas P. Dorman, Los Angeles, Calif.

Original application June 24, 1953, Serial No. 363,868, now Patent No. 2,808,893, dated October 8, 1957. Divided and this application April 18, 1957, Serial No. 653,653

3 Claims. (Cl. 123—119)

This invention relates generally to motor vehicles and particularly to superchargers for the engines thereof.

This application is a division of our pending application entitled Superchargers for Engines of Automotive Vehicles, filed June 24, 1953, Serial No. 363,868, now Patent No. 2,808,893, granted Oct. 8, 1957.

It is an object of our invention to provide for motor vehicle engines an improved supercharger of a character such that the engine carburetor will not be starved for air in the event the supercharger becomes blocked.

Another object of the invention is to provide an improved supercharger having a normally closed air intake controlled by a suction valve responsive to engine suction in the event of clogging of the supercharger so as to insure against stalling of the engine.

Specifically, it is an object of the invention to provide a supercharger of the above mentioned character in which the need of water drains that would affect the suction opening of the valve is eliminated without eliminating the water drainage function.

Other objects of the invention will become apparent from the following description taken in connection with the accompanying drawing in which.

Figure 1:
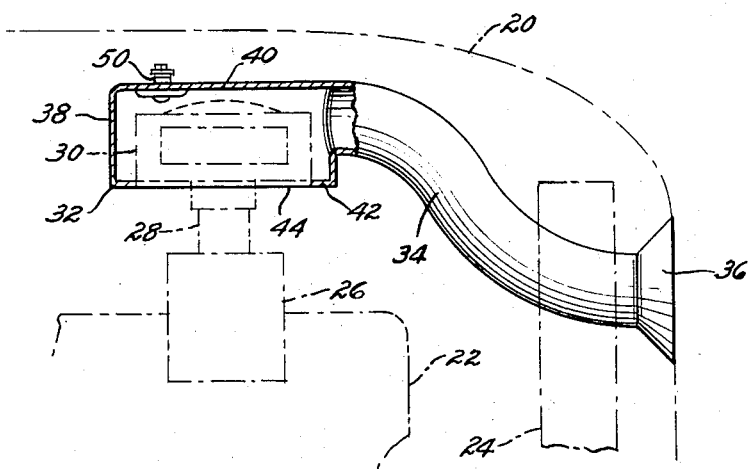
Fig. 1 is a side elevation of a motor vehicle engine supercharger embodying features of the invention.
Figure 2:
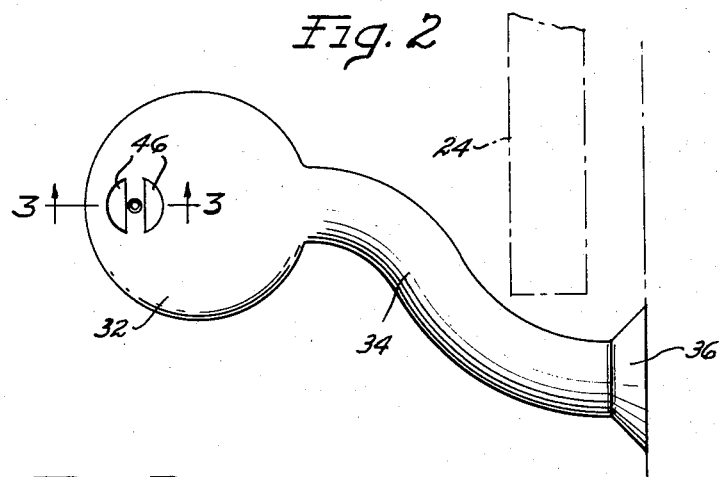
Fig. 2 is a plan view of the supercharger.
Figure 3:
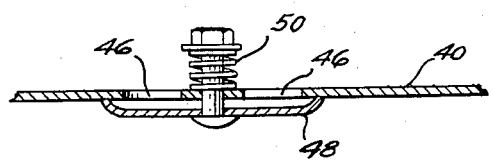
Fig. 3 is a sectional view, taken along line 3—3 of Fig. 2.

Referring to the drawing by characters of reference, the numeral 20 designates, in general, the hood of a motor vehicle engine compartment wherein is housed the vehicle power plant or engine 22, and an engine cooling system radiator 24. Mounted on the engine 22 and connected to the usual fuel intake manifold is a carburetor 26 having an upstanding air intake 28 onto the upper end of which is fitted a conventional air cleaner 30.

Our improved supercharger comprises an air cleaner housing 32 and an air supply duct 34. These are communicatively connected together and arranged to conduct air at ram pressure, during forward motion of the vehicle, to the air intake 28 of the carburetor 26 to improve the operating efficiency of engine 22 particularly at high speeds of operation of the vehicle. The housing 32 fits over and encloses the air cleaner 30, and the duct 34 extends from the housing forwardly at one side of the radiator 24. The front end, as at 36, of the duct 34 is open and faces forward to receive air at ram pressure during forward travel of the vehicle.

The housing 32 may be cylindrical, as shown, having a circular side wall 38, a top wall 40, and a bottom wall 42. In the housing bottom wall 42 is provided a circular opening 44 to receive the air cleaner 30, such that the housing 32 can be fitted down tightly over the air cleaner, as shown.

In order to insure against stalling of engine 22 in the event the duct inlet 36 becomes clogged by snow, debris, or other foreign matter, the housing 32 is provided with a pair of adjacent air inlets 46 that are normally closed by a suction operated valve 48. The air inlets 46 are provided in the housing top wall and valve 48 is within the housing and biased to closed position by a coil spring 50. The force of the spring 50 is such that the valve 48 will be pulled down in response to a predetermined decrease in pressure within housing 32 to open air inlets 46 and supply sufficient air to carburetor 26 to avoid stalling of the engine.

In order that the engine suction force acts only on the valve 48, in the event the duct air intake 36 becomes clogged, the housing 32 and duct 34 are made impervious to air including water drains, without loss of the function of draining water from the supercharger. To this end, the duct air intake 36 is located below the housing 32, the duct 34 preferably having a so-called reverse curve downwardly from housing 32 to the duct intake 36. Thus, the turn in the duct presents a water baffle to water which consequently is induced to drain out of the intake 36.

In operation, when the vehicle is traveling forward, air at ram pressure is conducted through duct 34 and housing 32 to the carburetor to improve operating efficiency of the engine 22. On rainy days, water entering the supercharger with the air impinges against the upwardly curving wall of duct 34 and thus is removed from the air stream and drains back and out of intake 36. In the event intake 36 becomes plugged by snow, debris, bugs, etc., the engine suction will decrease the pressure within housing 32, and since the only opening to atmosphere is through the valve controlled inlets 46, the valve 48 will instantly respond to engine created suction to allow sufficient air intake through inlets 46 to avoid stalling of the engine.

From the foregoing description, it will be understood that we have provided an improved motor vehicle engine supercharger of a character to ensure that in the event of its becoming clogged, sufficient air will be instantly supplied the engine to maintain combustion. The feature of our invention is the provision of a normally closed engine suction operated valve in the supercharger and the use of the air intake for water drainage so that there are no openings in the supercharger between the air intake and the air outlet when the intake is clogged. As a result, when the air intake becomes clogged, the suction force of the engine is directed solely to opening of the air valve, which thus is effected instantaneously so as to insure continued operation of the engine.

While we have shown and described our invention in detail, it will be understood that the invention is to be limited only by the spirit and scope of the appended claims.

We claim:

1. In an automobile having an engine provided with an air intake for combustion and an air cleaner connected to the air intake, a supercharger for the engine comprising, an air duct having a forwardly facing open end for air intake at ram pressure when the vehicle is traveling forward and having a rear discharge end for receiving and enclosing the air cleaner, said duct having its forwardly facing open end below its rear discharge end to effect drainage of water therefrom and the wall of said duct being impervious such that normally air enters said duct only by way of said forwardly facing open end, a normally closed air inlet in said duct for intake of air in the event of clogging of the forwardly facing open end of said duct, and a normally closed suction valve controlling said air inlet and responsive to engine suction.

2. In an automobile having an engine provided with an air intake for combustion and an air cleaner connected to the air intake, a supercharger for the engine comprising, a housing for receiving and enclosing the air cleaner, an air duct having a front air intake end and having a rear discharge end connected to said housing, said intake end of said duct lower than said discharge end to effect water drainage from the front end of said duct and the wall of said duct impervious to fluid flow therethrough, an air inlet in said housing for intake of sufficient air to avoid stalling of the engine in the event the front air intake becomes clogged, and a normally closed suction valve controlling said air inlet and responsive to predetermined decrease in pressure within said housing.

3. In an automobile having an engine provided with an air intake for combustion and an air cleaner connected to the intake, a supercharger for the engine comprising, a housing for enclosing the air cleaner and having a top wall, an air duct having a front air intake end and having a rear discharge end connected to and discharging into said housing, the wall of said duct impervious to intake of air, an air inlet in the top wall of said housing for intake of sufficient air to avoid stalling of the engine in the event the front air intake of said duct becomes clogged, and a normally closed suction valve within said housing controlling said air inlet and responsive to predetermined decrease in pressure within said housing.

References Cited in the file of this patent

UNITED STATES PATENTS

| | | |
|---|---|---|
| 1,865,514 | Godward | July 5, 1932 |
| 2,114,783 | Kowitt | Apr. 19, 1938 |
| 2,653,590 | Malstrom | Sept. 29, 1953 |
| 2,705,540 | Zierer | Apr. 5, 1955 |

FOREIGN PATENTS

| | | |
|---|---|---|
| 688,932 | Great Britain | July 28, 1950 |